US007865384B2

(12) United States Patent
Anderson et al.

(10) Patent No.: US 7,865,384 B2
(45) Date of Patent: Jan. 4, 2011

(54) SYSTEM AND METHOD FOR IDENTIFYING AND REDUCING COSTS OF INFORMATION TECHNOLOGY ACTIONS IN REAL TIME

(75) Inventors: Timothy Merrill Anderson, Rockford, IL (US); Warren John Baumann, Monroe, NY (US); Gregory James Fischer, Longmont, CO (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 11/840,322

(22) Filed: Aug. 17, 2007

(65) Prior Publication Data

US 2009/0048986 A1 Feb. 19, 2009

(51) Int. Cl.
*G06F 17/00* (2006.01)
*G06F 11/34* (2006.01)
(52) U.S. Cl. ............................................ 705/7; 705/11
(58) Field of Classification Search ........................ None
See application file for complete search history.

(56) References Cited

U.S. PATENT DOCUMENTS

| 5,825,883 | A * | 10/1998 | Archibald et al. ............. 705/53 |
| 7,366,812 | B2 * | 4/2008 | Lambourn et al. .......... 710/240 |
| 7,395,252 | B2 * | 7/2008 | Anderson et al. ............. 706/45 |
| 2003/0053615 | A1 * | 3/2003 | Anderson et al. ...... 379/265.09 |
| 2003/0074439 | A1 * | 4/2003 | Grabarnik et al. ........... 709/224 |
| 2004/0088334 | A1 * | 5/2004 | Klein ........................ 707/203 |
| 2005/0043979 | A1 * | 2/2005 | Soares et al. .................... 705/7 |
| 2005/0108084 | A1 * | 5/2005 | Ramamoorti et al. ......... 705/10 |
| 2005/0171797 | A1 * | 8/2005 | Abigail .......................... 705/1 |
| 2005/0283446 | A1 | 12/2005 | Dettinger et al. |
| 2006/0059032 | A1 * | 3/2006 | Wong et al. .................... 705/10 |
| 2006/0259308 | A1 * | 11/2006 | Browne et al. ................. 705/1 |
| 2009/0089130 | A1 * | 4/2009 | Malkin .......................... 705/8 |

OTHER PUBLICATIONS

Nemann, Bruce et al; "Cost Management Using ABC for IT Activities an Services" vol. 6 No. 1 Management Account Quarterly Fall 2004 29+.*
Babad et al. "Cost Driver Optimization in Activity-Based Costing" The Accounting Review, vol. 68 No. 3 (Jul. 1993), pp. 563-575. JSTOR Aug. 2010 <http://www.jstor.org/stable/248201>.*

* cited by examiner

*Primary Examiner*—Igor Borissov
*Assistant Examiner*—Tonya Joseph
(74) *Attorney, Agent, or Firm*—Schmeiser, Olsen & Watts; John R. Pivnichny

(57) ABSTRACT

A method and system for identifying and reducing costs of information technology actions in real time. Initiation of an information technology (IT) action by a user is detected. An actual cost to perform the IT action is determined in real time prior to a completion of the IT action. A target cost (e.g., average cost) to perform the IT action is obtained. The actual cost is determined to be greater than the target cost. Recommended actions for reducing the actual cost are obtained. A notification is presented to the user in real time and prior to the completion of the IT action. The notification includes a description or a link to a description of the recommended actions.

28 Claims, 6 Drawing Sheets

SYSTEM AND METHOD FOR IDENTIFYING AND REDUCING COSTS OF INFORMATION TECHNOLOGY ACTIONS IN REAL TIME

FIELD OF THE INVENTION

The present invention relates to a system and method for identifying and reducing costs of information technology actions in real time, and more particularly to a role, rule and policy-based data processing technique for identifying an actual cost of a user's activity performed via an information technology system, determining that the actual cost is greater than a target cost and presenting a notification to the user that facilitates the selection of cost-saving options relative to the activity.

BACKGROUND OF THE INVENTION

Employees of a company use information technology services provided by the company without understanding the costs associated with using the services. Some number of employees view information technology actions such as sending an email, downloading a file and surfing the web as costing nothing. Conventional techniques to address identifying the aforementioned costs include (1) covering all information technology service expenses as an overhead without providing an understanding of how much a particular service is costing; (2) charging a monthly or yearly fee for an information technology service and posting to a website for employees to use; and (3) billing based on usage similar to the way phone companies charge for minutes used while making phone calls. Each of the conventional techniques listed above provide costs after the fact (i.e., after an information technology action has been completed), thereby hindering cost-reducing adjustments of employees' behavior relative to information technology actions. Thus, there exists a need to overcome at least one of the preceding deficiencies and limitations of the related art.

SUMMARY OF THE INVENTION

The present invention provides a method of identifying and reducing costs of information technology actions in real time, comprising:

detecting, by a computing system, an initiation of an information technology (IT) action by a user of a computing unit coupled to the computing system;

determining, in real time by the computing system and prior to a completion of the IT action, an actual cost to perform the IT action;

obtaining, by the computing system, a target cost to perform the IT action;

comparing, by the computing system, the actual cost to the target cost;

determining, by the computing system, a result of the comparing, wherein the result is the actual cost being greater than the target cost;

obtaining, by the computing system, one or more recommended actions, wherein an outcome of performing the one or more recommended actions is a reduction of the actual cost to perform the IT action; and sending, in real time by the computing system and prior to the completion of the IT action, a notification to the computing unit to facilitate a presentation of the notification to the user by the computing unit, wherein the notification includes a description of the one or more recommended actions or a link thereto.

A system, computer program product, and a process for supporting computing infrastructure that provides at least one support service corresponding to the above-summarized method are also described and claimed herein.

Advantageously, the present invention provides a real time technique for identifying costs of performing an information technology action and reducing costs associated therewith.

DETAILED DESCRIPTION OF THE INVENTION

The present invention provides a user, in real time, a notification of an actual cost of performing an information technology (IT) action (a.k.a. IT task). The notification also informs the user whether the actual cost exceeds a target cost associated with the same IT action. The target cost is, for example, an average cost that other users incur to perform the same IT action. Furthermore, the present invention identifies one or more recommended options that, when performed, reduce the cost of performing the IT action. As used herein, an IT action is a set of one or more activities performed via an information technology system, such as attaching a 10 MB presentation file to an email and sending the email to 10 recipients.

Figure 1:
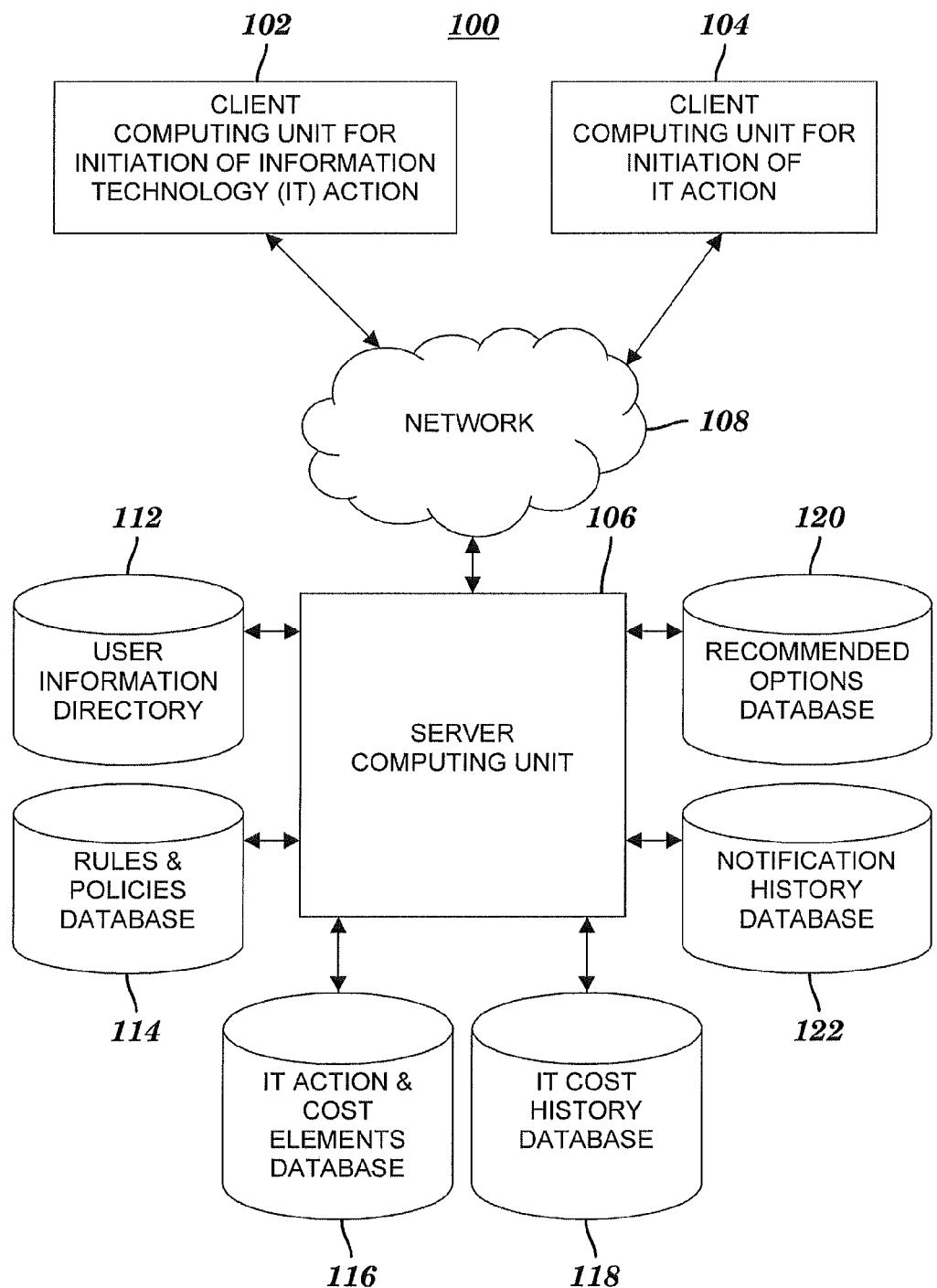
FIG. 1 is a block diagram of a system for identifying and reducing costs of information technology actions in real time, in accordance with embodiments of the present invention.

FIG. 1 is a block diagram of a system for identifying and reducing costs of IT actions in real time, in accordance with embodiments of the present invention. System 100 includes a plurality of client computing units (e.g., computing units 102 and 104) in communication with a server computing unit 106 via a network 108 (e.g., the Internet). Client computing units 102 and 104 are, for example, personal computers adapted to communicate with server 106. By utilizing the plurality of client computing units, users initiate IT actions whose costs are identified and for which other, cost-reducing actions are identified in real time by server computing unit 106. Included in system 100 and coupled to server computing unit 106 are one or more data storage units that include the following data: a user information directory 112, a rules & policies database 114, an IT action and cost elements database 116, an IT cost history database 118, a recommended options database 120 and a notification history database 122. The functionality of directory 112 and databases 114, 116, 118, 120 and 122 is described below relative to FIGS. 2A and 2B.

Figure 2A:
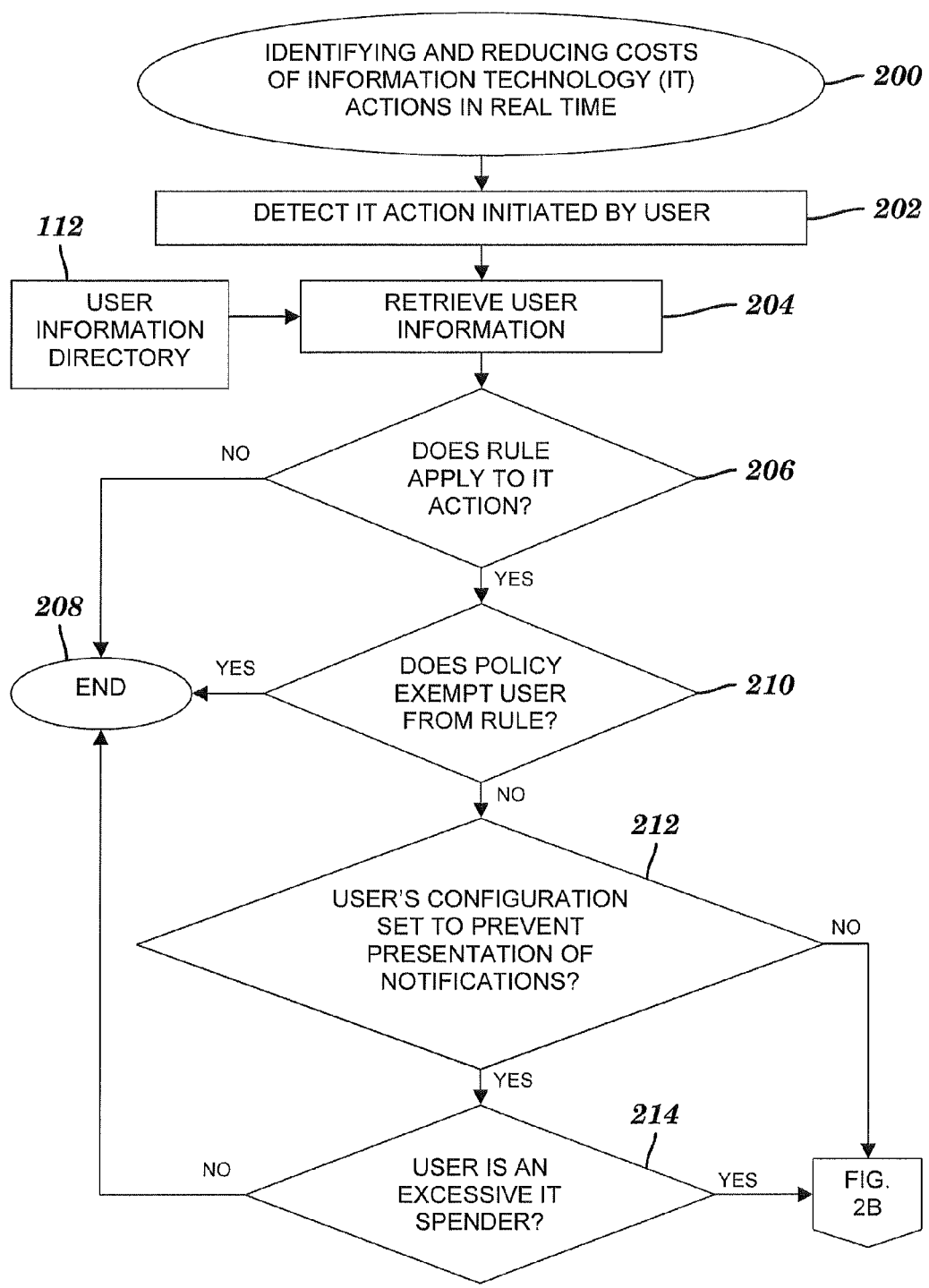
FIGS. 2A-2B depict a flow diagram of a process of identifying and reducing costs of information technology actions in real time, wherein the process is implemented by the system of FIG. 1, in accordance with embodiments of the present invention.
Figure 2B:
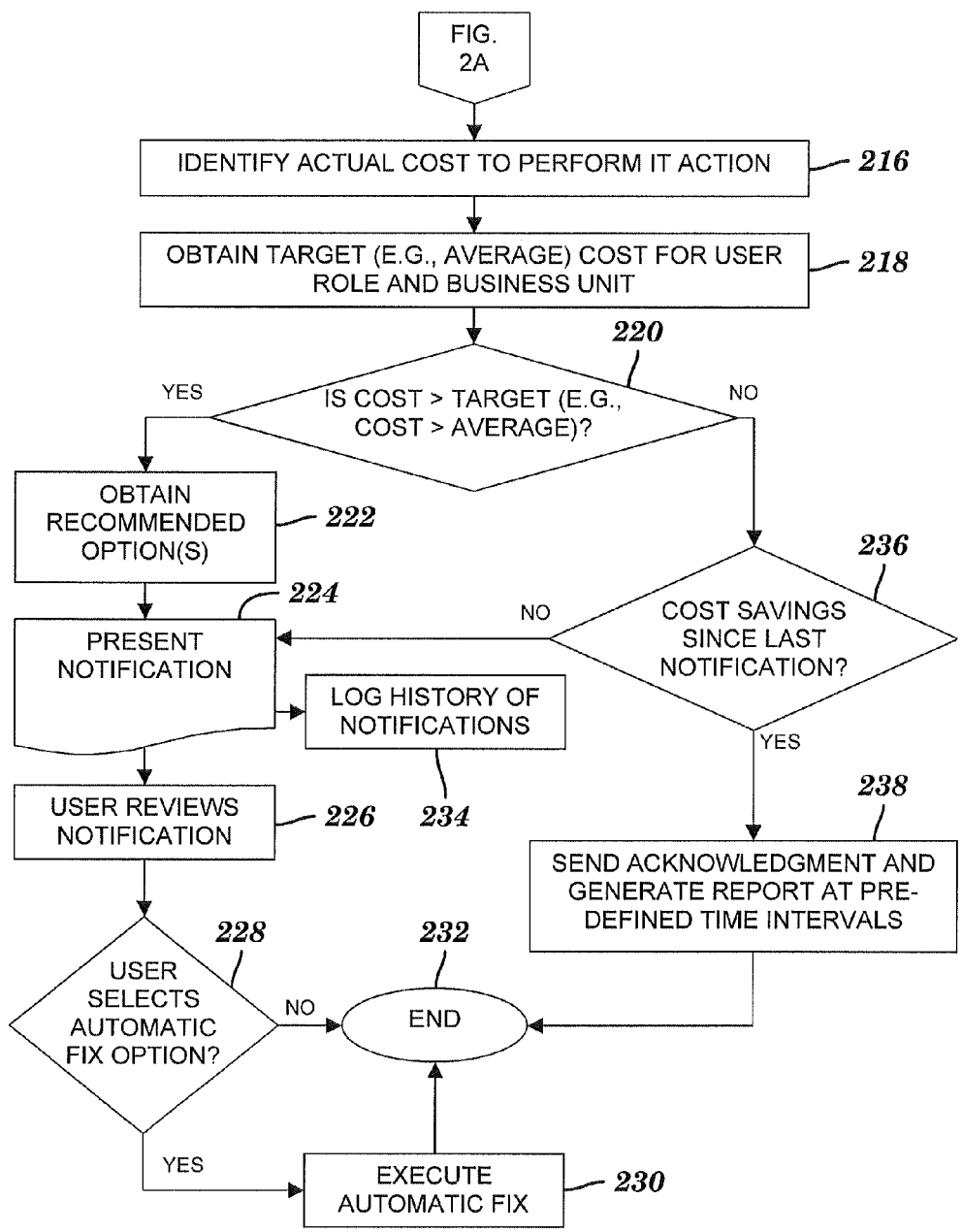

FIGS. 2A-2B depict a flow diagram of a process of identifying and reducing costs of information technology actions in real time, wherein the process is implemented by the system of FIG. 1, in accordance with embodiments of the present invention. Hereinafter, the process of FIGS. 2A-2B is also referred to as the IT cost identification and reduction process. The IT cost identification and reduction process starts at step 200 of FIG. 2A. In step 202, server computing unit 106 (see FIG. 1) detects an initiation of an IT action by a user of a client computing unit (e.g., computing unit 102 of FIG. 1). For simplicity, the initiation of the IT action detected in step 202 is hereinafter referred to as the IT action detected in step 202. In step 204, server computing unit 106 (see FIG. 1) retrieves information (a.k.a. user information) about the user who initiated the IT action detected in step 202. The user information is retrieved from user information directory 112. Directory 112 is accessed via, for example, Lightweight Directory Access Protocol (LDAP) or a local cache. The retrieved user information may be key data elements related to the user, such as the user's name, an ID of the user's company, a role of the user, an ID of a department that pays expenses of IT actions performed by the user, a name of the user's manager and historical data related to the costs of the user's previous IT actions. As used herein, a role of a user is defined as a designation of the user's type or level within an organization, where the type or level indicates a specific set of privileges granted to the user.

In inquiry step 206, computing unit 106 (see FIG. 1) checks for a predefined rule stored in rules & policies database 114 (see FIG. 1) that may apply to the IT action detected in step 202. Hereinafter, a predefined rule is also referred to simply as a rule. A rule that applies to an IT action includes conditions under which the IT action is permitted and/or is not permitted to be performed. Inquiry step 206 either identifies no rule in database 114 (see FIG. 1) that applies to the IT action or identifies one or more rules that apply to the IT action. If no applicable rule is identified in step 206, then the IT cost identification and reduction process of FIGS. 2A-2B ends at step 208. Otherwise, one or more rules is identified as being applicable to the IT action and the IT cost identification and reduction process continues with inquiry step 210.

In inquiry step 210, computing unit 106 (see FIG. 1) checks for any predefined policies stored in rules & policies database 114 (see FIG. 1) that may exempt the user from the rule(s) identified in step 206. Hereinafter, a predefined policy is also referred to simply as a policy. If inquiry step 210 identifies one or more policies that exempt the user from any of the rule(s) identified in step 206, then the IT cost identification and reduction process ends at step 208; otherwise, step 210 determines that the user is not exempt from the rule(s) identified in step 206 and the IT cost identification and reduction process continues with inquiry step 212.

In inquiry step 212, computing unit 106 identifies a setting of a configuration (a.k.a. user's configuration) of the user's client computing unit (e.g., computing unit 102 of FIG. 1) and determines whether or not the identified setting is pre-set to ignore notifications that alert the user regarding an IT action that has been initiated but is not permitted by one of the rules in database 114 (see FIG. 1). Such notifications are described in more detail below relative to step 224. If inquiry step 212 determines that the user's configuration is pre-set to prevent the presentation of the aforementioned notifications, then the IT cost identification and reduction process continues with inquiry step 214; otherwise the user's configuration is pre-set to allow the presentation of the notifications and the IT cost identification and reduction process continues with step 216 of FIG. 2B.

In inquiry step 214, computing unit 106 (see FIG. 1) determines if the user is identified as an excessive IT spender (i.e., a user whose expenditures for performing the IT action detected in step 202 either exceed a predefined threshold level or place the user in a predefined grouping relative to other users based on such expenditures) (e.g., the user is in the top 75% of users, grouped according to costs incurred for performing the IT action). If the user is an excessive IT spender, then the IT cost identification and reduction process continues with step 216 of FIG. 2B; otherwise, the process ends at step 208. In one embodiment, step 214 is performed for a given user only at predefined time intervals (e.g., once a month).

In step 216 of FIG. 2B, computing unit 106 (see FIG. 1) identifies an actual cost of performing the IT action detected in step 202 (see FIG. 2A). The actual cost identified in step 216 is derived from predefined cost elements retrieved from IT action & cost elements database 116 (see FIG. 1). The retrieved cost elements include, for example, network costs, virtual private network costs if the user is working remotely, delivery costs, storage costs, and server costs (e.g., raised floor, staffing, hardware and software costs related to a particular server). The identification of the actual cost in step 216 is performed in real time and prior to the completion of the IT action detected in step 202 (see FIG. 2A). In step 218, computing unit 106 (see FIG. 1) determines the target cost to perform the IT action detected in step 202 (see FIG. 2A). The target cost may be a calculated average (e.g., mean or median) cost or a pre-specified amount (e.g., an amount pre-specified by the user's manager so that a business objective may be attained). If the target cost is a pre-specified amount, computing unit 106 (see FIG. 1) retrieves the pre-specified amount in step 218 from a data storage unit coupled to computing unit 106 (see FIG. 1). The target cost may be determined at a predefined level of granularity (e.g., an average cost of sending an email that includes one or more attachments rather than an average cost of sending any email). The target cost is based on, for example, the user's role and the user's business unit.

In one embodiment, the target cost obtained in step 218 is an average cost of a plurality of users performing the IT action. Computing unit 106 (see FIG. 1) determines the average cost by accessing IT cost history database 118 (see FIG. 1) to retrieve historical data of the plurality of users' expenditures for performing the same IT action detected in step 202 (see FIG. 2A).

In inquiry step 220, computing unit 106 (see FIG. 1) compares the actual cost determined in step 216 to the target cost obtained in step 218. If inquiry step 220 determines that the actual cost is greater than the target cost, then in step 222 computing unit 106 (see FIG. 1) obtains one or more recommended options (i.e., one or more recommended actions) that, when performed, reduce the cost of performing the IT action detected in step 202 (see FIG. 2A). The one or more recommended options are obtained by accessing predefined recommended options in recommended options database 120 (see FIG. 1). The one or more recommended options obtained in step 222 are predefined based on the IT task detected in step 202 (see FIG. 2A) and may also be based on the particular difference determined between the actual cost identified in step 216 and the target cost obtained in step 218 and/or the particular role of the user.

In step 224, computing unit 106 (see FIG. 1) generates a notification that includes the actual cost of performing the IT action. If step 224 is the next step after step 222, then the generated notification also includes or references one or more descriptions of the one or more recommended actions obtained in step 222. In real time and prior to the completion of the IT action detected in step 202 (see FIG. 2A), computing unit 106 (see FIG. 1) sends the generated notification to the user's client computing unit (e.g., computing unit 102 of FIG. 1). Also in step 224, the user's client computing unit (e.g., computing unit 102 of FIG. 1) receives the notification sent from computing unit 106 (see FIG. 1) and presents (e.g., displays onscreen for a user-configurable amount of time) the notification to the user. The presentation of the notification in step 224 is performed in real time and prior to the completion of the IT action detected in step 202 (see FIG. 2A). For example, the notification presented in step 224 includes one or more links that, when activated by the user, display descriptions of recommended actions that reduce the cost of performing the IT action.

In one embodiment, a user for whom the cost of performing the IT action is less than or equal to the target cost may select an option or have a pre-configured option to prevent the display of the notification in step 224. Further, a user for whom the cost of performing the IT action exceeds the target cost may select an option or have a pre-configured option to prevent the display of the notification for a predefined amount of time.

In step 226, the user reviews the notification. If step 226 follows steps 222 and 224 in sequence, then the user reviews the description of the one or more recommended actions. In one embodiment, at least one of the one or more recommended actions may be automatically performed via an initiation of the at least one recommended action by the user choosing an automatic fix selection (e.g., activating an onscreen link for an automatic fix). If step 228 determines that the user chooses an automatic fix selection, then in step 230 computing unit 106 (see FIG. 1) automatically executes the chosen automatic fix, which automatically performs a recommended action (i.e., without the user performing any action) and lowers the cost of performing the IT action. The IT cost identification and reduction process ends at step 232.

If the user does not choose the automatic fix selection (i.e., the No branch of step 228), or no automatic fix selections exist, then the user may choose to perform none or at least one of the recommended actions whose description is included or referenced in the notification reviewed in step 226 and the IT cost identification and reduction process ends at step 232. The user's performance of at least one of the recommended actions results in a reduced cost of performing the IT action detected in step 202 (see FIG. 2A).

Returning to the presentation of the notification, step 224 is also followed by step 234, in which computing unit 106 (see FIG. 1) logs the information in the notification to notification history database 122 (see FIG. 1).

Returning to inquiry step 220, if the actual cost determined in step 216 is less than or equal to the target cost obtained in step 218, then computing unit 106 (see FIG. 1) determines in inquiry step 236 whether or not there has been a cost savings since the most recent notification presented in step 224. Step 236 is performed after the process of FIGS. 2A-2B is repeated for a subsequent initiation of the IT action (a.k.a. the subsequent IT action) originally detected as described above in step 202 (see FIG. 2A). The originally detected IT action is hereinafter also referred to as the initial IT action. In the repeat of the process of FIGS. 2A-2B, the subsequent IT action is detected in step 202 (see FIG. 2A) and the IT action referred to in subsequent steps of FIGS. 2A-2B is the subsequent IT action. The subsequent IT action differs from the initial IT action in that the subsequent IT action is the result of the user performing at least one of the recommended actions included or referred to in the notification reviewed in step 226. It should be noted that the actual cost of performing the subsequent IT action as identified in step 216 and the target cost obtained in step 218 following the detection of the subsequent IT action may be different from the actual cost and target cost, respectively, which are associated with the initial IT action. Hereinafter, the actual cost and target cost associated with the subsequent IT action are also referred to as the second actual cost and the second target cost, respectively.

The cost savings is indicated in step 236 if the second actual cost (i.e., the actual cost of performing the subsequent IT action) is less than the actual cost of performing the initial IT action (i.e., the aforementioned actual cost determined in the initial performance of step 216). If step 236 identifies such cost savings since the last notification, then in step 238 computing unit 106 (see FIG. 1) sends the user an acknowledgment (e.g., a thank you or a notice of appreciation) of the user performing one of the recommended actions described by a previous notification reviewed in step 226. In one embodiment, the acknowledgment sent in step 238 is also sent to the user's manager. In one embodiment, at predefined time intervals, computing unit 106 (see FIG. 1) generates a report in step 238 that details the cost savings for the IT action. The report is, for example, a monthly report directed to management that presents cost savings related to IT actions, where the cost savings are realized because recommended actions are performed by the employees. The report may summarize the cost savings by divisions of an organization.

If inquiry step 236 does not identify any of the aforementioned cost savings since the last notification, then the IT cost identification and reduction process repeats with a follow-up notification presented to the user in step 224. Such a follow-up notification is presented to the user in step 224 under the following conditions: (1) the user's client computing unit is pre-configured to allow the presentation of notifications (see step 212 of FIG. 2A) or (2) the user is identified as being an excessive IT spender (see step 214 of FIG. 2A). The follow-up notification includes information about the actual cost of performing the subsequent IT action, without including any recommended options. The follow-up notification is also logged in notification history database 122 (see FIG. 1) in step 234.

In one embodiment, the rules & policies database 114 (see FIG. 1) is optionally included in system 100 (see FIG. 1) and steps 206, 208, 210, 212 and 214 of FIG. 2A and steps 236 and 238 of FIG. 2B are optionally included in the IT cost identification and reduction process. For example, the retrieval of user information in step 204 (see FIG. 2A) may be immediately followed by the identification of the actual cost to perform the IT action step 216, without including the aforementioned checks of the rules & policies database and the user's configuration settings.

EXAMPLE

Figure 3A:
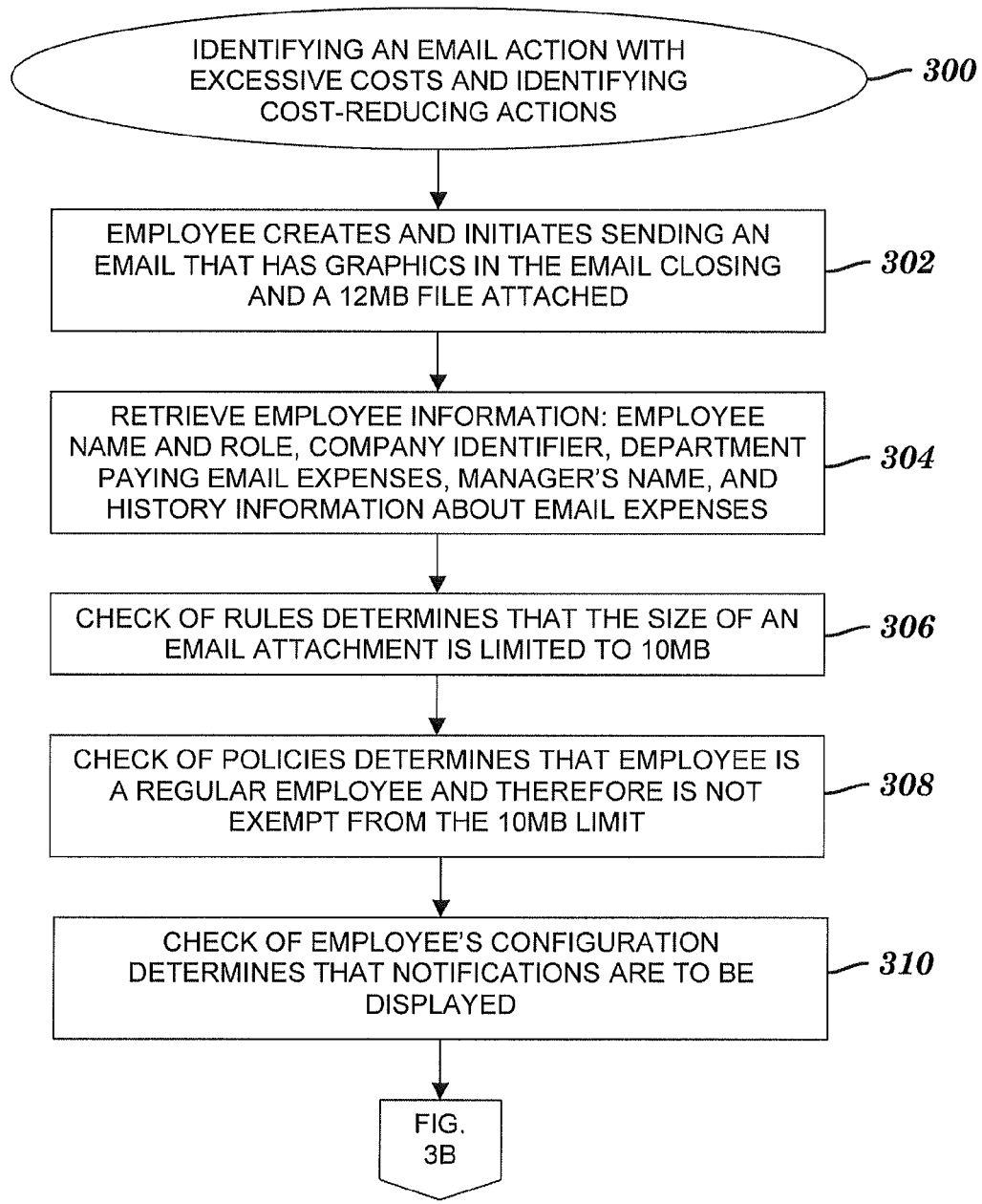
FIGS. 3A-3B depict a flow diagram of an exemplary process of identifying excessive costs of sending an email and identifying cost-reducing actions associated with the email, in accordance with embodiments of the present invention.
Figure 3B:
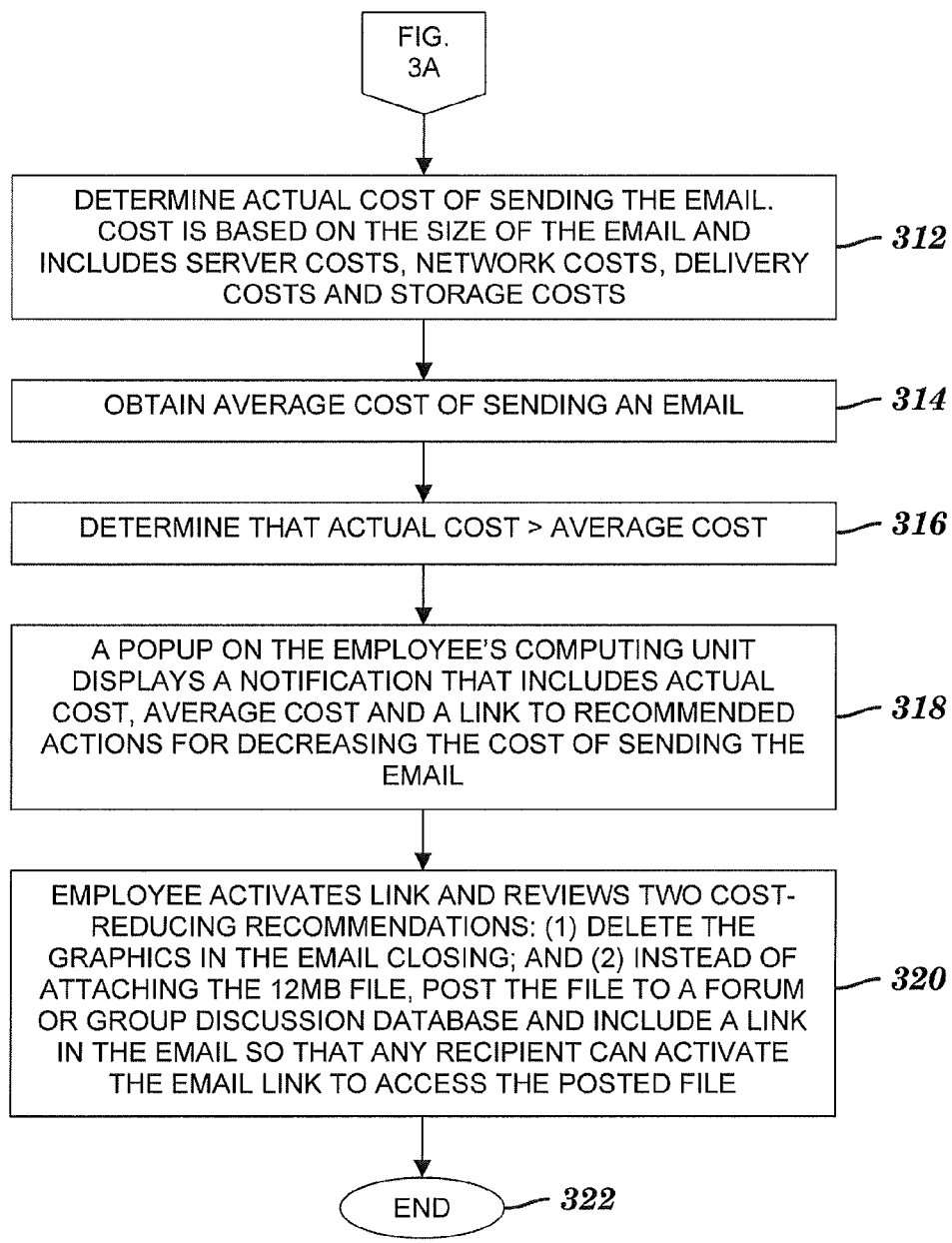

FIGS. 3A-3B depict a flow diagram of an exemplary process of identifying excessive costs of sending an email and identifying cost-reducing actions associated with the email, in accordance with embodiments of the present invention. Hereinafter, the exemplary process of FIGS. 3A-3B is also referred to as the email scenario. The email scenario starts at step 300 in FIG. 3A. In step 302, an employee of company XYZ using client computing unit 102 (see FIG. 1) creates an email and initiates sending the email to 20 recipients. The email created in step 302 includes graphics in the email closing and has, for example, a 12 MB file attached. Also in step 302, the initiation of sending the email is detected by server computing unit 106 (see FIG. 1). Step 302 corresponds to step 202 of FIG. 2A.

In step 304, employee information (i.e., user information related to the employee sending the email) is retrieved by computing unit 106 (see FIG. 1). The employee information includes employee name and role, an identifier of company XYZ, an identifier of the department that pays the expenses for the employee sending email, the name of the employee's manager, and historical data regarding previous expenses related to the employee sending email. The employee information is retrieved in step 304 from user information directory 112 (see FIG. 1). Step 304 corresponds to step 204 of FIG. 2A.

In step 306, computing unit 106 (see FIG. 1) checks the rules in rules & policies database 114 (see FIG. 1) and determines that the size of an email attachment is, for example, limited to 10 MB. Step 306 corresponds to the Yes branch of step 206 (see FIG. 2A).

In step 308, computing unit 106 (see FIG. 1) checks the policies in rules & policies database 114 (see FIG. 1) and determines that the employee is a regular employee and is therefore not exempt from the rule that limits the size of email attachments to 10 MB. Step 308 corresponds to the No branch of step 210 (see FIG. 2A).

In step 310, computing unit 106 (see FIG. 1) checks the configuration of the employee's computing unit (i.e., computing unit 102 of FIG. 1). The configuration indicates that notifications are set to be displayed in popups on the screen of computing unit 102 (see FIG. 1). Step 310 corresponds to the No branch of step 212 (see FIG. 2A). The email scenario continues with step 312 of FIG. 3B.

In step 312, the actual cost of sending the email created in step 302 is determined by computing unit 106 (see FIG. 1). The actual cost of sending the email is based on the size of the email and includes server costs, network costs, delivery costs and storage costs. The actual cost determined in step 312 is obtained from IT action & cost elements database 116 (see FIG. 1). Step 312 corresponds to step 216 (see FIG. 2B).

In step 314, computing unit 106 (see FIG. 1) obtains the average cost of sending an email by any employee of company XYZ. To compute the average cost in step 314, computing unit 106 (see FIG. 1) accesses historical data in IT cost history database 118 (see FIG. 1). Step 314 corresponds to step 218 (see FIG. 2B).

In step 316, computing unit 106 (see FIG. 1) determines that the actual cost determined in step 312 is greater than the average cost obtained in step 314. Step 316 corresponds to the Yes branch of step 220 (see FIG. 2B).

In step 318, a popup on computing unit 102 (see FIG. 1) displays a notification that includes the actual cost determined in step 312, the average cost obtained in step 314, and a link that, when activated, displays suggestions for actions that decrease the cost of sending the email created in step 302 (see FIG. 3A). Step 318 corresponds to step 224 (see FIG. 2B).

In step 320, the employee activates the link included in the notification to display the following descriptions of actions to decrease the cost of sending the email created in step 302 (see FIG. 3A): (1) delete the graphics in the email closing; and (2) instead of attaching the 12 MB file to the email, post the file to a forum or group discussion database and include a link in the email so that any of the email's recipients can activate the link in the email to access the file from the forum or group discussion database. The employee reviews the cost-reducing recommendations and is given the opportunity to perform one or both of the recommended actions before the email is sent. The email scenario ends at step 322.

Computing System

Figure 4:
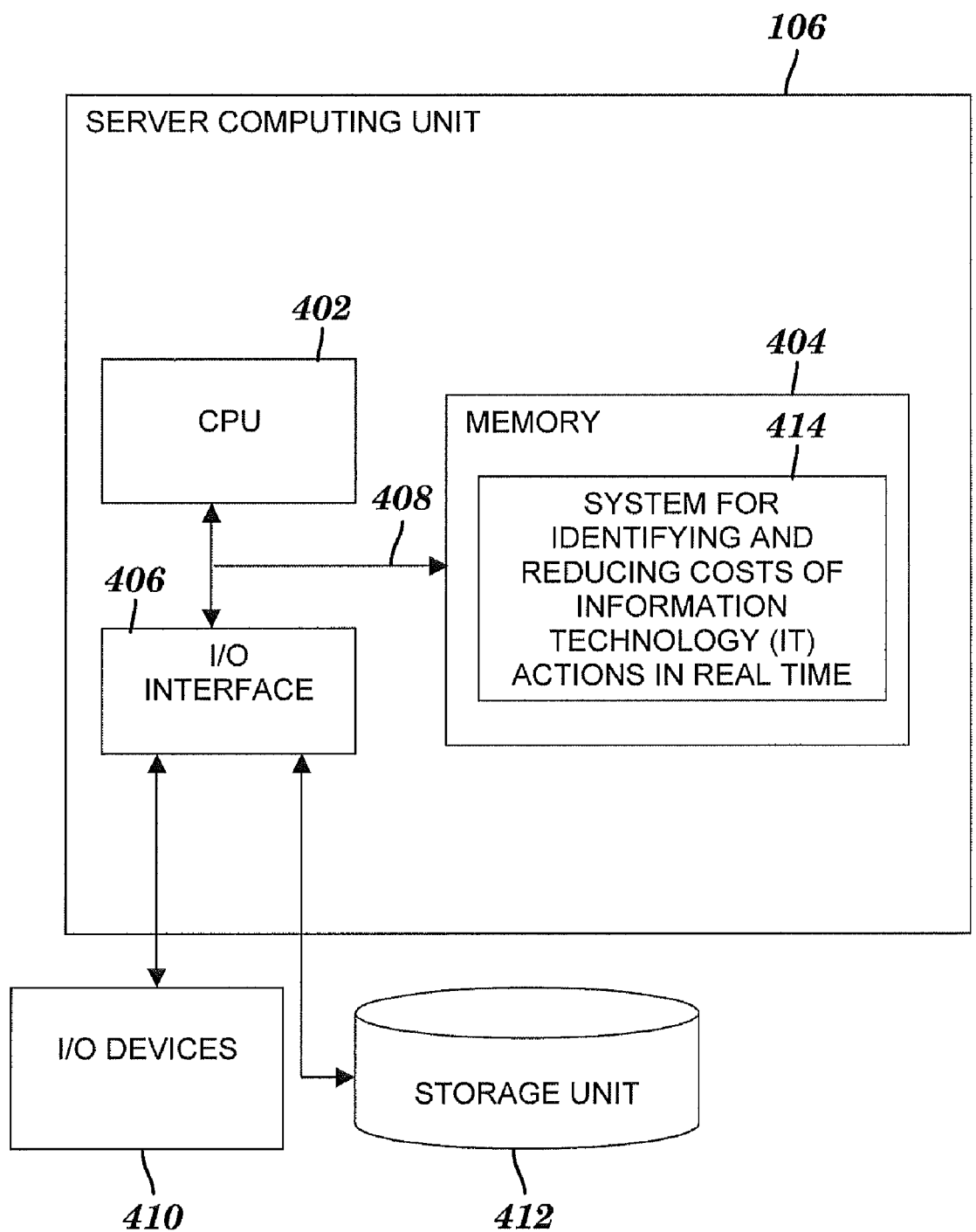
FIG. 4 is a block diagram of a computing system that implements the process of FIGS. 2A-2B, in accordance with embodiments of the present invention.

FIG. 4 is a block diagram of a computing unit that is included in the system of FIG. 1 and that implements the process of FIGS. 2A-2B, in accordance with embodiments of the present invention. Computing unit 106 generally comprises a central processing unit (CPU) 402, a memory 404, an input/output (I/O) interface 406, a bus 408, I/O devices 410 and a storage unit 412. CPU 402 performs computation and control functions of computing unit 106. CPU 402 may comprise a single processing unit, or be distributed across one or more processing units in one or more locations (e.g., on a client and server).

Memory 404 may comprise any known type of data storage and/or transmission media, including bulk storage, magnetic media, optical media, random access memory (RAM), read-only memory (ROM), a data cache, a data object, etc. Cache memory elements of memory 404 provide temporary storage of at least some program code in order to reduce the number of times code must be retrieved from bulk storage during execution. Storage unit 412 is, for example, a magnetic disk drive or an optical disk drive that stores data. Moreover, similar to CPU 402, memory 404 may reside at a single physical location, comprising one or more types of data storage, or be distributed across a plurality of physical systems in various forms. Further, memory 404 can include data distributed across, for example, a LAN, WAN or storage area network (SAN) (not shown).

I/O interface 406 comprises any system for exchanging information to or from an external source. I/O devices 410 comprise any known type of external device, including a display monitor, keyboard, mouse, printer, speakers, handheld device, printer, facsimile, etc. Bus 408 provides a communication link between each of the components in computing unit 106, and may comprise any type of transmission link, including electrical, optical, wireless, etc.

I/O interface 406 also allows computing unit 106 to store and retrieve information (e.g., program instructions or data) from an auxiliary storage device (e.g., storage unit 412). The auxiliary storage device may be a non-volatile storage device (e.g., a CD-ROM drive which receives a CD-ROM disk). Computing unit 106 can store and retrieve information from other auxiliary storage devices (not shown), which can include a direct access storage device (DASD) (e.g., hard disk or floppy diskette), a magneto-optical disk drive, a tape drive, or a wireless communication device.

Memory 404 includes computer program code 414 for the system disclosed herein for identifying and reducing costs of IT actions in real time. Further, memory 404 may include other systems not shown in FIG. 4, such as an operating system (e.g., Linux) that runs on CPU 402 and provides control of various components within and/or connected to computing unit 106.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 414 for use by or in connection with a computing unit 106 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 404, ROM, a rigid magnetic disk and an optical disk.

Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of identifying and reducing costs of IT actions in real time. Thus, the present invention discloses a process for supporting computer infrastructure, comprising integrating, hosting, maintaining and deploying computer-readable code into a computing system (e.g., computing unit 106), wherein the code in combination with the computing unit is capable of performing a method of identifying and reducing costs of IT actions in real time.

In another embodiment, the invention provides a business method that performs the process steps of the invention on a subscription, advertising and/or fee basis. That is, a service provider, such as a Solution Integrator, can offer to create, maintain, support, etc. a method of identifying and reducing costs of IT actions in real time. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. Detecting, by a computing system, an initiation of an information technology (IT) action by a user of a computing unit coupled to said computing system;
    determining, in real time by said computing system and prior to a completion of said IT action, an actual cost to perform said IT action;
    obtaining, by said computing system, a target cost to perform said IT action;
    comparing, by said computing system, said actual cost to said target cost;
    determining, by said computing system, a result of said comparing, wherein said result is said actual cost being greater than said target cost;
    obtaining, by said computing system, one or more recommended actions, wherein an outcome of performing said one or more recommended actions is a reduction of said actual cost to perform said IT action;
    sending, in real time by said computing system and prior to said completion of said IT action, a notification to said computing unit wherein said notification includes a description of or a link to said one or more recommended actions, and wherein said notification further includes a cost-reducing link associated with a recommended action of said one or more recommended actions;
    receiving, by said computing system, a selection of said cost-reducing link; and
    automatically performing, by said computing system and in response to said receiving said selection, said recommended action, wherein a result of said automatically performing said recommended action is a reduction in said actual cost.

2. The method of claim 1, further comprising identifying, by said computing system, a predefined rule that applies to said IT action, wherein said predefined rule determines whether or not said IT action is permitted to be performed.

3. The method of claim 2, wherein said predefined rule determines that said IT action is permitted to be performed, and wherein said method further comprises:
    identifying, by said computing system, a predefined policy that determines whether said user is exempt from said predefined rule; and determining said predefined policy does not exempt said user from said predefined rule.

4. The method of claim 3, further comprising identifying, by said computing system, a configuration setting of said computing unit, wherein said configuration setting is associated with said user, and wherein said configuration setting is not pre-set to prevent a presentation of said notification by said computing unit.

5. The method of claim 3, further comprising identifying, by said computing system, a configuration setting of said computing unit, wherein said configuration setting is associated with said user, and wherein said configuration setting is pre-set to prevent a presentation of said notification by said computing unit.

6. The method of claim 5, further comprising determining, by said computing system, an amount of expenditures for performing said IT action by said user, wherein said amount of expenditures exceeds a predefined threshold level, and wherein said amount of expenditures is indicated by historical data.

7. Detecting, by said computing system and subsequent to said presenting said notification, an initiation of a subsequent IT action by said user and a performance of a recommended action of said one or more recommended actions, wherein said subsequent IT action is a result of said performance of said recommended action;
    determining, by said computing system and prior to a completion of said subsequent IT action, a second actual cost to perform said subsequent IT action;
    obtaining, by said computing system, a second target cost to perform said subsequent IT action;
    comparing, by said computing system, said second actual cost to said second target cost;
    determining, by said computing system, a second result of said comparing said second actual cost to said second target cost, wherein said second result is said second actual cost being less than or equal to said second target cost;
    determining, by said computing system, a cost savings associated with performing said subsequent IT action, said cost savings indicated by said second actual cost being less than said actual cost to perform said IT action; and
    sending, by said computing system, an acknowledgment of said cost savings to said user.

8. The method of claim 1, wherein said target cost is an average cost to perform said IT action.

9. The method of claim 1, wherein said actual cost includes at least one cost of performing said IT action selected from the group consisting of a server cost, a network cost, a delivery cost and a storage cost.

10. A computing system comprising: a processor; and a computer-readable memory unit, coupled to said processor, said memory unit containing instructions that when carried out by said processor implement a method identifying and reducing costs of information technology actions in real time, said method comprising:

- detecting, by said computing system, an initiation of an information technology (IT) action by a user of a computing unit coupled to said computing system;
- determining, in real time by said computing system and prior to a completion of said IT action, an actual cost to perform said IT action;
- obtaining, by said computing system, a target cost to perform said IT action;
- comparing, by said computing system, said actual cost to said target cost;
- determining, by said computing system, a result of said comparing, wherein said result is said actual cost being greater than said target cost;
- obtaining, by said computing system, one or more recommended actions, wherein an outcome of performing said one or more recommended actions is a reduction of said actual cost to perform said IT action;
- sending, in real time by said computing system and prior to said completion of said IT action, a notification to said computing unit wherein said notification includes a description of or a link to said one or more recommended actions wherein said notification further includes a cost-reducing link associated with a recommended action of said one or more recommended actions;
- receiving, by said computing system, a selection of said cost-reducing link; and
- automatically performing, by said computing system and in response to said receiving said selection, said recommended action, wherein a result of said automatically performing said recommended action is a reduction in said actual cost.

11. A computer program product, comprising a computer readable storage medium having a computer readable program code stored therein, said computer readable program code containing instructions that when executed by a processor of a computing system implement a method for identifying and reducing costs of information technology actions in real time, said method comprising:

- detecting, by said computing system, an initiation of an information technology (IT) action by a user of a computing unit coupled to said computing system;
- determining, in real time by said computing system and prior to a completion of said IT action, an actual cost to perform said IT action;
- obtaining, by said computing system, a target cost to perform said IT action;
- comparing, by said computing system, said actual cost to said target cost;
- determining, by said computing system, a result of said comparing, wherein said result is said actual cost being greater than said target cost;
- obtaining, by said computing system, one or more recommended actions, wherein an outcome of performing said one or more recommended actions is a reduction of said actual cost to perform said IT action;
- sending, in real time by said computing system and prior to said completion of said IT action, a notification to said computing unit wherein said notification includes a description of or a link to said one or more recommended actions, and wherein said notification further includes a cost-reducing link associated with a recommended action of said one or more recommended actions;
- receiving, by said computing system, a selection of said cost-reducing link; and
- automatically performing, by said computing system and in response to said receiving said selection, said recommended action, wherein a result of said automatically performing said recommended action is a reduction in said actual cost.

12. The program product of claim 11, wherein said method further comprises identifying a predefined rule that applies to said IT action, wherein said predefined rule determines whether or not said IT action is permitted to be performed.

13. The program product of claim 12, wherein said predefined rule determines that said IT action is permitted to be performed, and wherein said method further comprises:
- identifying, by said computing system, a predefined policy that determines whether said user is exempt from said predefined rule; and determining said predefined policy does not exempt said user from said predefined rule.

14. The program product of claim 13, wherein said method further comprises identifying a configuration setting of said computing unit, wherein said configuration setting is associated with said user, and wherein said configuration setting is not pre-set to prevent a presentation of said notification by said computing unit.

15. The program product of claim 13, wherein said method further comprises identifying a configuration setting of said computing unit, wherein said configuration setting is associated with said user, and wherein said configuration setting is pre-set to prevent a presentation of said notification by said computing unit.

16. The program product of claim 15, wherein said method further comprises determining an amount of expenditures for performing said IT action by said user, wherein said amount of expenditures exceeds a predefined threshold level, and wherein said amount of expenditures is indicated by historical data.

17. The program product of claim 11, wherein said method further comprises:
- detecting, by said computing system and subsequent to said presenting said notification, an initiation of a subsequent IT action by said user and a performance of a recommended action of said one or more recommended actions, wherein said subsequent IT action is a result of said performance of said recommended action;
- determining, by said computing system and prior to a completion of said subsequent IT action, a second actual cost to perform said subsequent IT action;
- obtaining, by said computing system, a second target cost to perform said subsequent IT action;
- comparing, by said computing system, said second actual cost to said second target cost;
- determining, by said computing system, a second result of said comparing said second actual cost to said second target cost, wherein said second result is said second actual cost being less than or equal to said second target cost;
- determining, by said computing system, a cost savings associated with performing said subsequent IT action, said cost savings indicated by said second actual cost being less than said actual cost to perform said IT action; and
- sending, by said computing system, an acknowledgment of said cost savings to said user.

18. The program product of claim 11, wherein said target cost is an average cost to perform said IT action.

19. The program product of claim 11, wherein said actual cost includes at least one cost of performing said IT action selected from the group consisting of a server cost, a network cost, a delivery cost and a storage cost.

20. Detecting, an initiation of an information technology (IT) action by a user of a computing unit coupled to said computing system;
   determining, in real time and prior to a completion of said IT action, an actual cost to perform said IT action;
   obtaining a target cost to perform said IT action;
   comparing said actual cost to said target cost;
   determining, by said computing system, a result of said comparing, wherein said result is said actual cost being greater than said target cost;
   obtaining, by said computing system, one or more recommended actions, wherein an outcome of performing said one or more recommended actions is a reduction of said actual cost to perform said IT action; sending, in real time by said computing system and prior to said completion of said IT action, a notification to said computing unit wherein said notification includes a description of or a link to said one or more recommended actions, and wherein said notification further includes a cost-reducing link associated with a recommended action of said one or more recommended actions;
   receiving, by said computing system, a selection of said cost-reducing link; and
   automatically performing, by said computing system and in response to said receiving said selection, said recommended action, wherein a result of said automatically performing said recommended action is a reduction in said actual cost.

21. The process of claim 20, wherein said method further comprises identifying a predefined rule that applies to said IT action, wherein said predefined rule determines whether or not said IT action is permitted to be performed.

22. The process of claim 21, wherein said predefined rule determines that said IT action is permitted to be performed, and wherein said method further comprises:
   identifying, by said computing system, a predefined policy that determines whether said user is exempt from said predefined rule and determining said predefined policy does not exempt said user from said predefined rule.

23. The process of claim 22, wherein said method further comprises identifying a configuration setting of said computing unit, wherein said configuration setting is associated with said user, and wherein said configuration setting is not pre-set to prevent a presentation of said notification by said computing unit.

24. The process of claim 22, wherein said method further comprises identifying a configuration setting of said computing unit, wherein said configuration setting is associated with said user, and wherein said configuration setting is pre-set to prevent a presentation of said notification by said computing unit.

25. The process of claim 24, wherein said method further comprises determining an amount of expenditures for performing said IT action by said user, wherein said amount of expenditures exceeds a predefined threshold level, and wherein said amount of expenditures is indicated by historical data.

26. Detecting, by said computing system and subsequent to said presenting said notification, an initiation of a subsequent IT action by said user and a performance of a recommended action of said one or more recommended actions, wherein said subsequent IT action is a result of said performance of said recommended action;
   determining, by said computing system and prior to a completion of said subsequent IT action, a second actual cost to perform said subsequent IT action;
   obtaining, by said computing system, a second target cost to perform said subsequent IT action;
   comparing, by said computing system, said second actual cost to said second target cost;
   determining, by said computing system, a second result of said comparing said second actual cost to said second target cost, wherein said second result is said second actual cost being less than or equal to said second target cost;
   determining, by said computing system, a cost savings associated with performing said subsequent IT action, said cost savings indicated by said second actual cost being less than said actual cost to perform said IT action; and
   sending, by said computing system, an acknowledgment of said cost savings to said user.

27. The process of claim 20, wherein said target cost is an average cost to perform said IT action.

28. The process of claim 20, wherein said actual cost includes at least one cost of performing said IT action selected from the group consisting of a server cost, a network cost, a delivery cost and a storage cost.

* * * * *